United States Patent
Huns et al.

(10) Patent No.: US 8,421,918 B2
(45) Date of Patent: Apr. 16, 2013

(54) DE-INTERLACING VIDEO

(75) Inventors: Thomas Huns, Verwood (GB); Dan Eley, Bordon (GB)

(73) Assignee: Snell Limited, Hampshire (GB)

( * ) Notice: Subject to any disclaimer, the term of this patent is extended or adjusted under 35 U.S.C. 154(b) by 948 days.

(21) Appl. No.: 12/100,626

(22) Filed: Apr. 10, 2008

(65) Prior Publication Data

US 2008/0252779 A1   Oct. 16, 2008

(30) Foreign Application Priority Data

Apr. 11, 2007  (GB) .................................. 0706988.3

(51) Int. Cl.
 *H04N 7/01*   (2006.01)
(52) U.S. Cl.
 USPC .......................................... 348/452; 348/446
(58) Field of Classification Search .................. 348/446, 348/452, E5.013, E5.065, E5.066, E5.109, 348/E5.11
 See application file for complete search history.

(56) References Cited

U.S. PATENT DOCUMENTS

| | | | |
|---|---|---|---|
| 5,682,205 A * | 10/1997 | Sezan et al. | 348/452 |
| 5,796,437 A | 8/1998 | Muraji et al. | |
| 6,269,484 B1 | 7/2001 | Simsic et al. | |
| 2002/0047919 A1 * | 4/2002 | Kondo et al. | 348/441 |
| 2002/0171759 A1 | 11/2002 | Handjojo et al. | |
| 2005/0110902 A1 | 5/2005 | Yang | |
| 2007/0258014 A1 * | 11/2007 | Doswald | 348/701 |

FOREIGN PATENT DOCUMENTS

| | | |
|---|---|---|
| GB | 2411784 | 9/2005 |
| WO | WO 01/74082 | 10/2001 |
| WO | WO 2005/076612 | 8/2005 |

OTHER PUBLICATIONS

Search Report for Application No. GB0706988.3 dated Jul. 31, 2007.

* cited by examiner

*Primary Examiner* — Kieu Oanh T Bui
(74) *Attorney, Agent, or Firm* — Pearl Cohen Zedek Latzer, LLP

(57) ABSTRACT

A video de-interlacer forms a first new-pixel value from motion compensation of a pixel of a previous field with a first motion vector and forms a second new-pixel value from motion compensation of a pixel of a next field with a second motion vector. These two new-pixel values are then summed with a weighting which depends upon the respective confidence values associated with the two motion vectors.

6 Claims, 1 Drawing Sheet

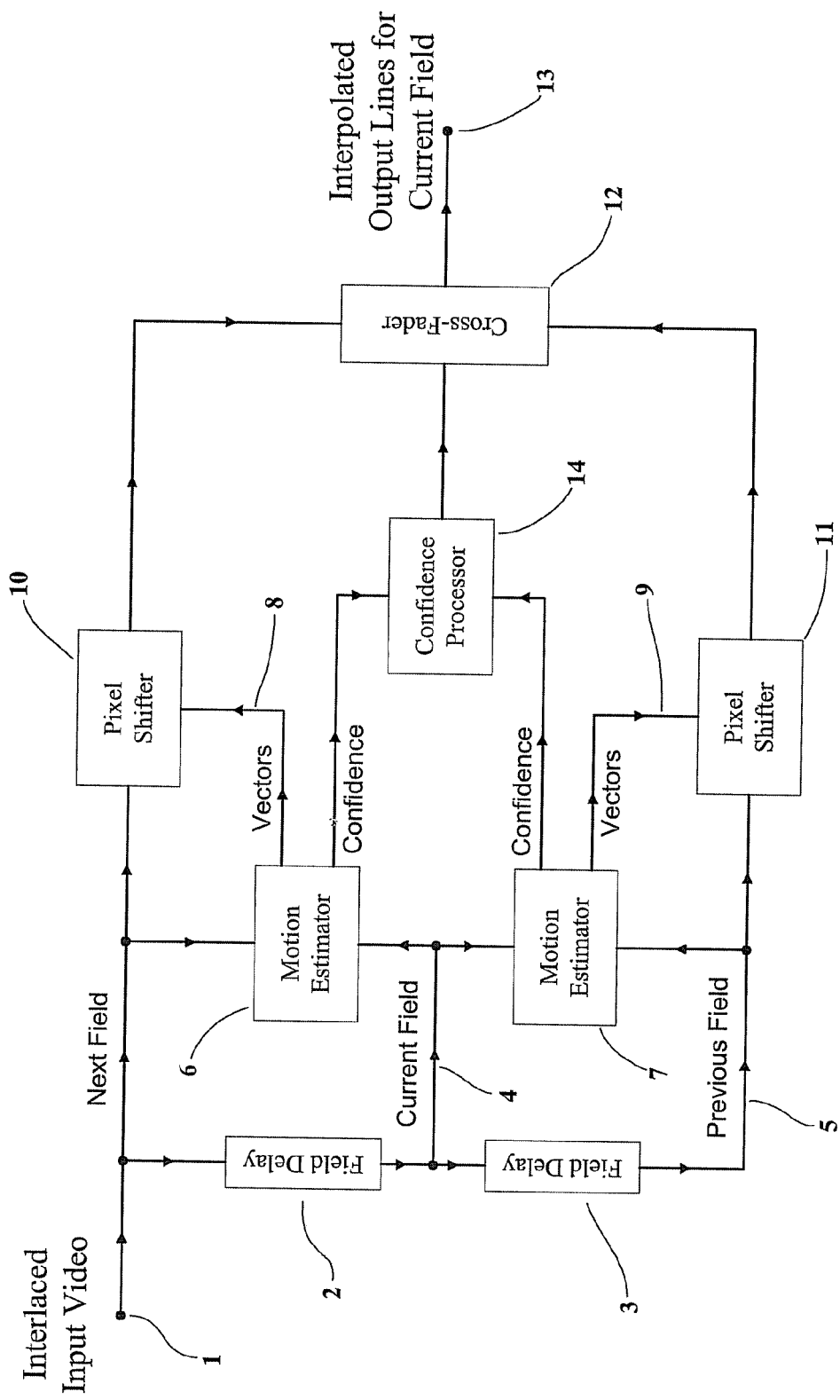

DE-INTERLACING VIDEO

CROSS-REFERENCE TO RELATED APPLICATIONS

This application claims priority from Great Britain Patent Application No. 0706988.3, filed Apr. 11, 2007, which is hereby incorporated by reference.

FIELD OF INVENTION

This invention concerns spatio-temporal interpolation of images.

BACKGROUND OF THE INVENTION

Two to one interlaced scanning, in which the spatial sampling grid is offset vertically by half the vertical sample pitch on alternate temporal samples, is a very common method of reducing the bandwidth of television images. Now that more modern (often transform-based) data compression methods are available and electron-beam-scanned displays are less common, the use of interlaced scanning is becoming less attractive.

De-interlacing can form part of many video processes; by de-interlacing at the input to a process, that process can be made easier. Examples include standards conversion and re-scaling.

It is therefore frequently necessary to convert an interlaced image sequence to a progressively scanned sequence so that the converted images occur at the temporal sampling rate (i.e. the field rate) of the input sequence and all of them have the same spatial sampling structure. Each converted output image of the sequence thus has twice as many vertical samples (scanning lines) as each original input image; and, pixel data values are available for all vertical sample positions and temporal sample points.

This conversion is a spatio-temporal interpolation process and it is generally known as "de-interlacing". It has been found that best subjective results are obtained by de-interlacing systems which take into account the motion of portrayed objects: either by motion adaptation, in which movement is detected and the interpolation changed as a result; or, by using motion compensation, in which the change in position of objects between consecutive fields is measured, and used to "compensate" the positions of pixels in one field to the positions that the objects they portray would occupy in a different field. These positional changes are commonly described by two-dimensional "motion vectors" and in typical motion compensated processes one or more vectors are associated with each image pixel.

Several methods of motion vector derivation are known in the art; the most common are phase-correlation and block-matching. In phase correlation blocks of contiguous pixels are transformed into the spatial frequency domain and the phases of the spatial frequency components are correlated between co-located blocks in consecutive fields. In block matching the values of groups of contiguous blocks of pixels are compared with similar, but spatially shifted, groups of pixels in adjacent fields so as to find the shift vector which gives the best match of the pixel values. Typically the match error is evaluated as a sum of the magnitudes of pixel value differences over a block of pixels.

SUMMARY OF THE INVENTION

The inventors have appreciated that certain motion measurement techniques provide information additional to the motion vector values and that this additional information can be used to obtain superior de-interlacing of images.

The invention consists in a method and apparatus for de-interlacing a video field in which new pixels to be added to the said field are derived from temporally adjacent fields comprising the steps of:

Forming a first new-pixel value from motion compensation of a pixel of an earlier field with a first motion vector Forming a second new-pixel value from motion compensation of a pixel of a later field with a second motion vector Combining the said first and second new-pixel values in dependence upon a comparison of respective confidence values associated with the said first and second motion vectors so as to obtain a value for a new pixel to be added to the said field to be de-interlaced.

Advantageously, the said first motion vector is derived from motion measurement between the said field to be de-interlaced and the preceding temporally adjacent field; and, the said second motion vector is derived from motion measurement between the said field to be de-interlaced and the next temporally adjacent field.

The first and second new-pixel values may be combined by addition, with appropriate scaling factors related to or determined by the respective confidence values.

In a preferred embodiment the said confidence value is derived from the height of a peak in a phase-correlation surface.

In an alternative embodiment the said confidence value is derived from the match-error in a block-matching process.

Other techniques may be employed to combine the said first and second new-pixel values to provide a new pixel, such that the weight of a pixel value in the new pixel is inversely related to the estimated error in the derivation of that pixel value.

In a yet further embodiment, new pixel values derived by combination of said first and second new-pixel values in dependence on comparison of vector confidence values are adaptively combined with other new pixel values derived by one or more alternative methods.

In one aspect of the invention, there is provided apparatus for de-interlacing a video field in which new pixels to be added to the said field are derived from temporally adjacent fields comprising a field delay arrangement for making available a next field, a current field and a previous field; a motion estimator for forming a first motion vector from the previous field to the current field with a first motion vector confidence value and a second motion vector from the next field to the current field with a second motion vector confidence value; a first pixel shifter for forming a first new-pixel value from a pixel of the previous field and the first motion vector; a second pixel shifter for forming a second new-pixel value from a pixel of the next field and the second motion vector; and a combiner receiving the first and second motion vector confidence values and serving to combine the said first and second new-pixel values in dependence upon a comparison of the respective confidence values as to obtain a value for a new pixel to be added to the said field to be de-interlaced.

Advantageously, the apparatus further comprises a confidence processor serving to compare the first and second motion vector confidence values to generate a multi-valued parameter k, said combiner forming a weighted sum of the first and second new-pixel values governed said parameter k.

It is important in this aspect that the parameter k is not a binary value simply adapting or switching from one value to the other. The continuously varying nature of the parameter k and the smooth fading that this permits, contribute significantly to the performance of this embodiment.

An important application of embodiments of this invention lies in de-interlacing video material which combines true video material with video material obtained from film in 2:2 or 3:2 processes. Changes in mode can occur between fields and modes can also be mixed within a field. A video originating logo may, for example, be imposed on film originating material. The ability of the parameter k to vary from field to field and also in preferred arrangements from pixel to pixel, is therefore important. The skilled man will also appreciate that it is important for these reasons that the processing combines pixels directly—in the manner of a finite impulse response filter (FIR)—without the use of recursion.

Another important feature of aspects of this invention is that the motion measurement is conducted directly upon the input interlaced fields. The confidence measures of such vectors are therefore strong indicators of the nature of the video material. Any material processing of the input interlaced material (such as for example a preliminary de-interlacing filter) would likely degrade the relationship between the confidence in the vector and the nature of the material and specifically the film/video mode of the material.

BRIEF DESCRIPTION OF THE DRAWING

FIG. 1 shows a block diagram of a de-interlacer according to an embodiment of the invention.

DETAILED DESCRIPTION OF THE INVENTION

FIG. 1 shows an example of a de-interlacing system according to the invention. An input interlaced video signal (1) is required to be de-interlaced; i.e. for every input field an additional set of pixels is required located at vertical positions mid way between the existing pixels and representing the same point in time as the existing pixels.

The input sequence of interlaced fields (1) is delayed in two, cascaded field delays (2) (3). If the output (4) from the first field delay (2) is regarded as the "current field", then the un-delayed input (1) can be considered the "next field", and the output (5) from the second field delay (3) can be considered to be the "previous field".

A motion estimator (6) compares the current field (4) with the next field (1) so as to obtain motion vectors (8). These vectors define, for each pixel of the current field (4), the equivalent position of the object portrayed by that pixel in the next field (1). These vectors (8) are therefore "forward vectors" for the current field (4). A similar motion estimator (7) derives "backward vectors" (9) from comparison with the previous field (5).

A pixel shifter (10) uses the motion vectors (8) to find values for additional pixels at intermediate vertical positions in the current field (4) by shifting appropriate pixels of the next field (1) to the positions of the additional pixels. As the vectors (8) were derived for the existing pixels of the current field (4) it will be necessary to find equivalent vectors at the locations of the new pixels to be created. This can be done by interpolation of the vector field; in most cases "zero order interpolation" can be used so that the vector from a vertically adjacent position is used. The value of each new pixel is set to the value of the existing pixel in the next field (1) whose location (relative to the new pixel location) is determined by the motion vector. Where the location determined by the motion vector does not correspond exactly with that of an existing pixel, a weighted sum of two or more existing pixel values can be used to obtain the necessary value according to well-known sub-pixel interpolation techniques.

A similar pixel shifter (11) uses the backward vectors (9) to derive a second set of new pixel values (co-located with the new pixels created by the pixel-shifter (10)) from the values of the pixels of the previous field (5) by shifting objects portrayed in the previous field (5) to their positions at the time of the current field (4).

Because the input video sequence (1) is interlaced, the pixels of the next field (1) and the previous field (5) will be located vertically between the pixels of the current field (4). Depending on the characteristics of the video signal, it may sometimes be preferable to use the pixels derived from the next field (1) and at other times it may be preferable to use the pixels derived from the previous field (5). The preferred source of additional pixels may not be the same throughout a particular field; this will frequently be the case when different video sources, having different temporal sampling characteristics, have been combined.

This problem is solved by making use of additional information from the motion estimators (6) (7). As explained in the introduction, motion vectors are determined by a correlation process between pixels of adjacent fields, and the maximum value of a correlation parameter is used to determine the relevant motion vector. For example, in the well-known phase-correlation technique a two-dimensional correlation surface is obtained and peaks in the surface represent candidate motion vectors; the co-ordinates of the locations of the peaks correspond to the components of vectors. The heights of the peaks give a measure of confidence that the corresponding vector is accurate. Similarly, in the block-matching method of motion estimation, a match-error value is obtained and the error value corresponding to an output motion vector can be used to calculate a measure of confidence for that vector. For example, the match error can be input to a function which returns a high confidence value for small match errors and returns a low confidence value for large match errors.

In the invention, each of the vectors comprising the sets of motion vectors (8) (9) is accompanied by a respective confidence value. As described above, each of these sets of vectors has been used to create a respective set of new pixel values: one set from the next field (1); and, a second set from the previous field (5). A set of additional pixels (13) to be used to de-interlace the current field (4) is derived by combining co-located pairs of pixels from the pixel shifter (10) and the pixel shifter (11) in a cross-fader (12). Typically the output of the cross-fader is given by:

$$F = K \cdot A + (1-K) \cdot B$$

Where: F is the fader output

A and B are the two fader inputs; and,

K is a fader-control parameter

The cross-fader (12) combines each pixel from the pixel shifter (10) with the corresponding co-located pixel from the pixel shifter (11) according to the fader-control parameter K derived in a confidence processor (14). The confidence processor (14) compares the vector confidence values of the vectors used to create the respective shifted pixels. Where the confidence of the forward vector (8) is higher than the confidence of the backward vector (9), a value of K greater than one half is output, and the contribution of the pixel from the shifter (10) to the output pixel (13) is greater than the contribution from the shifter (11).

As the sequence of input fields progresses the sets of output pixels (13) from the cross-fader (12) can be combined with the respective sets of pixels of the current field (4) so as to obtain a sequence of de-interlaced fields in which each output field has twice the vertical resolution of each input field.

There are other, known methods for de-interlacing, for example as described in patent GB 2 197 152, or in International Patent Application WO 2006/075178. These alternative methods can be adaptively combined with the method of the present invention in a system which forms new pixel-values by two or more methods and the new output pixels are formed of a weighted sum of the values from the different methods. In such a system the weights are varied in dependence upon one or more adaptation control signals. Suitable control signals include: inter-field pixel differences; intra-field pixel differences; and motion vector magnitudes.

The invention claimed is:

1. A method of de-interlacing a video field in which new pixels to be added to the said field are derived from temporally adjacent fields comprising the steps of
   forming a first new-pixel value from motion compensation of a pixel of an earlier field with a first motion vector;
   forming a second new-pixel value from motion compensation of a pixel of a later field with a second motion vector;
   wherein each of the first motion vector and the second motion vector is determined as a peak in a phase-correlation surface with the coordinates of the location of the peak representing vector components and the height of the peak giving confidence value; and
   combining the said first and second new-pixel values in dependence upon a comparison of respective confidence values associated with the said first and second motion vectors so as to obtain a value for a new pixel to be added to the said field to be de-interlaced.

2. A method according to claim 1 in which the said first motion vector is derived from motion measurement between the said field to be de-interlaced and the preceding temporally adjacent field; and, the said second motion vector is derived from motion measurement between the said field to be de-interlaced and the next temporally adjacent field.

3. Apparatus for de-interlacing a video field in which new pixels to be added to the said field are derived from temporally adjacent fields comprising
   a field delay arrangement for making available a next field, a current field and a previous field;
   a phase correlation motion estimator for forming a first motion vector from the previous field to the current field with a first motion vector confidence value derived from the height of a peak associated with the first motion vector in a phase-correlation surface and a second motion vector from the next field to the current field with a second motion vector confidence value derived from the height of a peak associated with the second motion vector in a phase-correlation surface;
   a first pixel shifter for forming a first new-pixel value from a pixel of the previous field and the first motion vector;
   a second pixel shifter for forming a second new-pixel value from a pixel of the next field and the second motion vector; and
   a combiner receiving the first and second motion vector confidence values and serving to combine the said first and second new-pixel values in dependence upon a comparison of the respective confidence values as to obtain a value for a new pixel to be added to the said field to be de-interlaced.

4. Apparatus according to claim 3, further comprising a confidence processor serving to compare the first and second motion vector confidence values to generate a multi-valued parameter k, said combiner forming a weighted sum of the first and second new-pixel values governed said parameter k.

5. A computer program product containing instructions to perform a method of de-interlacing a video field in which new pixels to be added to the said field are derived from temporally adjacent fields comprising the steps of
   forming a first new-pixel value from motion compensation of a pixel of an earlier field with a first motion vector;
   forming a second new-pixel value from motion compensation of a pixel of a later field with a second motion vector;
   wherein each of the first motion vector and the second motion vector is determined as a peak in a phase-correlation surface with the coordinates of the location of the peak representing vector components and the height of the peak giving a confidence value; and
   combining the said first and second new-pixel values in dependence upon a comparison of respective confidence values associated with the said first and second motion vectors so as to obtain a value for a new pixel to be added to the said field to be de-interlaced.

6. Video processing apparatus comprising of de-interlacing a video field in which new pixels to be added to the said field are derived from temporally adjacent fields comprising means for:
   forming a first new-pixel value from motion compensation of a pixel of an earlier field with a first motion vector;
   forming a second new-pixel value from motion compensation of a pixel of a later field with a second motion vector;
   wherein each of the first motion vector and the second motion vector is determined as a peak in a phase-correlation surface with the coordinates of the location of the peak representing vector components and the height of the peak giving a confidence value; and
   combining the said first and second new-pixel values in dependence upon a comparison of respective confidence values associated with the said first and second motion vectors so as to obtain a value for a new pixel to be added to the said field to be de-interlaced.

* * * * *